United States Patent
Kontorovich et al.

(10) Patent No.: US 7,150,238 B1
(45) Date of Patent: Dec. 19, 2006

(54) BULBER WITH DIRT RELEASE MECHANISM

(75) Inventors: Boris Kontorovich, Brooklyn, NY (US); Clay Burns, New York, NY (US); Carly Price, Evanston, IL (US); Wilfrido Loor, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 11/247,315

(22) Filed: Oct. 11, 2005

(51) Int. Cl.
*A01C 5/02* (2006.01)

(52) U.S. Cl. .......................... 111/92; 111/106; 172/22; 172/378

(58) Field of Classification Search .................. 172/22; 111/114, 106, 95, 92; 47/1.01 P
See application file for complete search history.

(56) References Cited

U.S. PATENT DOCUMENTS

| | | | |
|---|---|---|---|
| 182,367 A | 9/1876 | Jones | |
| 357,544 A | 2/1887 | Albright | |
| 594,305 A | 11/1897 | Wight | |
| D30,847 S | 5/1899 | Faiz | |
| D32,852 S | 6/1900 | Mann | |
| 816,238 A | 3/1906 | Kline | |
| 843,399 A | 2/1907 | King | |
| 985,598 A | 2/1911 | Jacobs | |
| 1,007,241 A | 10/1911 | Schlatter | |
| 1,053,730 A | 2/1913 | Jensen | |
| 1,077,822 A * | 11/1913 | Engleman | 111/92 |
| 1,572,431 A | 2/1926 | Hansen | |
| 1,726,207 A | 8/1929 | Beck | |
| 1,752,467 A | 4/1930 | Strawn | |
| 1,860,963 A | 5/1932 | Smith | |
| D89,682 S | 4/1933 | Crossdale, Jr. et al. | |
| 1,970,108 A | 8/1934 | Strait | |
| 1,983,815 A * | 12/1934 | Schmiett | 47/1.01 R |
| 2,014,311 A | 9/1935 | Council | |
| 2,028,483 A | 1/1936 | Van Yehree | |
| 2,216,720 A | 10/1940 | Cousine | |
| 2,371,563 A | 3/1945 | Walter | |
| 2,589,774 A | 3/1952 | Chatfield | |
| 2,686,073 A | 8/1954 | Benoist | |
| 2,729,493 A * | 1/1956 | Engel | 111/101 |
| 2,891,813 A * | 6/1959 | Inaki | 294/50.6 |
| 2,975,848 A | 3/1961 | Roberts | |
| 3,272,930 A | 9/1966 | Gottfried | |
| D208,416 S | 8/1967 | Sudmeier | |
| 3,369,834 A | 2/1968 | Miles | |
| 3,749,034 A | 7/1973 | Bergius et al. | |
| 3,765,347 A * | 10/1973 | Tormstrom | 111/200 |
| D242,012 S | 10/1976 | Kotajervi | |
| 4,005,897 A | 2/1977 | Smith | |
| 4,122,905 A | 10/1978 | Kanigan | |
| 4,135,752 A | 1/1979 | Long | |

(Continued)

*Primary Examiner*—Victor Batson
(74) *Attorney, Agent, or Firm*—Seyfarth Shaw LLP (57) ABSTRACT

A handheld bulber for use in planting and gardening is disclosed. The bulber has a rigid steel inverted conical frustum body of at least two opposing and slightly overlapping sidewall members pivotably joined together and a handle attached opposite a serrated cutting edge of the body. A movable dirt release mechanism is positioned between the handle and the pivot point such that moving the mechanism toward the handle, i.e., a squeezing hand motion, forces the handle end of the side members inward, thereby pivoting the digging end of the sidewall members outward. The dirt release mechanism may be attached within the slotted openings by a slider, rollers, or any other suitable means.

22 Claims, 8 Drawing Sheets

U.S. PATENT DOCUMENTS

| | | | | |
|---|---|---|---|---|
| D267,405 | S | 12/1982 | Wilson | |
| 4,483,133 | A * | 11/1984 | Pasley | 56/400.06 |
| 4,585,072 | A | 4/1986 | Martinez | |
| 4,618,007 | A | 10/1986 | Kayes | |
| 4,807,710 | A | 2/1989 | Greeley | |
| 4,828,309 | A | 5/1989 | Germaine | |
| 4,843,982 | A | 7/1989 | Nagy-Szakaly | |
| 4,884,638 | A | 12/1989 | Hoffman | |
| 4,901,800 | A | 2/1990 | Wilson | |
| 4,932,339 | A | 6/1990 | List | |
| 4,951,584 | A | 8/1990 | Pearce | |
| 4,986,368 | A | 1/1991 | Underwood et al. | |
| 5,031,707 | A | 7/1991 | Gerasimenko et al. | |
| 5,052,314 | A | 10/1991 | Leini | |
| 5,085,431 | A | 2/1992 | McGuire | |
| 5,133,269 | A | 7/1992 | Charneski | |
| 5,427,189 | A | 6/1995 | Bennett | |
| 5,431,115 | A * | 7/1995 | Auer | 111/92 |
| 5,454,435 | A | 10/1995 | Reinhardt | |
| 5,469,923 | A | 11/1995 | Visser | |
| 5,476,298 | A | 12/1995 | Etemadian | |
| 5,493,977 | A * | 2/1996 | Maisch | 111/92 |
| D368,211 | S | 3/1996 | Skold | |
| 5,540,433 | A | 7/1996 | Engstrom et al. | |
| 5,564,353 | A | 10/1996 | Wade et al. | |
| 5,601,321 | A | 2/1997 | Simon | |
| 5,615,744 | A | 4/1997 | Krafka | |
| D381,246 | S | 7/1997 | Basek | |
| D381,892 | S | 8/1997 | Porter et al. | |
| 5,865,259 | A | 2/1999 | Catto | |
| 6,119,787 | A | 9/2000 | Garcia | |
| 6,123,374 | A | 9/2000 | Elder | |
| 6,138,589 | A * | 10/2000 | Miller et al. | 111/106 |
| 6,257,346 | B1 | 7/2001 | Schofield et al. | |
| 6,296,068 | B1 | 10/2001 | Frederick | |
| 6,349,776 | B1 * | 2/2002 | Hus | 172/375 |
| 6,439,629 | B1 | 8/2002 | Bieth | |
| 6,505,869 | B1 * | 1/2003 | Novotny | 294/50.6 |
| 6,595,298 | B1 | 7/2003 | Crady | |
| 6,615,928 | B1 | 9/2003 | Dueitt | |
| 6,662,879 | B1 | 12/2003 | Costa | |

* cited by examiner

BULBER WITH DIRT RELEASE MECHANISM

BACKGROUND OF THE INVENTION

This application relates to gardening tools such as bulbers. In particular, this application relates to hand-held bulbers of the type used to dig holes in, for example, a flower or vegetable garden. The application relates most specifically to a hand-held bulber having a dirt release mechanism.

A bulber of the common form includes a handle, usually made of wood, steel, or hard plastic, either with or without a cushioned covering material, attached to a metal cylindrical body having a distal edge. The distal edge is typically crenellated or serrated to assist "cutting" into hard ground surfaces. With sufficient downward pressure and moderate back-and-forth rotational movement of the handle, the formed edge facilitates digging. Once a sufficient depth is reached, the digging motion is reversed to extract a core of dirt within the cylindrical body. Before a subsequent hole can be dug the dirt core must be removed from the bulber.

One option is to remove the dirt by hand, attempting to push the packed earth out either end of the cylindrical body. This is an undesirable solution because people working with or without gloves may not want to dirty the gloves or their hands. Also, the steel edges of the bulber may be sharp enough to cause injury if impacted by a bare hand. Another solution has been to provide an expandable cylindrical body at the distal end. While this has been accomplished in several ways, the common element seems to be to use a two-piece handle where one piece telescopes into the other and can be compressed together to thereby force out the distal end of the bulber. Initially, this compression may be done by the fingers of one hand. However, due to the structural rigidity required of the cylindrical body, repeatedly compressing the handle may require considerably more strength than is capable by a single hand of the user.

The present invention is unique in that it addresses each of these, as well as other problems found in the prior art. By providing a bulber which is suitably rigid along the metal body to support digging, but which also provides a suitable mechanism to repeatedly and reliably release dirt from the body, the present invention solves these problems.

SUMMARY

There is disclosed herein an improved handheld bulber which avoids the disadvantages of prior bulbers while affording additional structural and operating advantages.

In an embodiment there is provided a bulber comprising a substantially rigid inverted-conical frustum body having opposing side members, a handle attached at one end to each side member, and a release mechanism movably attached to each of the side members, wherein moving the release mechanism from a first position to a second position thereby pivots the side members outward at an opposite end.

In one aspect of the bulber the release mechanism is preferably attached to a recessed surface on each side member. The recessed surfaces are preferably sloped outward in a direction toward the handle. The release mechanism are preferably attached within slotted openings in each side member. However, an area of the side members proximate each slotted opening may be sloped outward in a direction toward the handle.

Another aspect of an embodiment of the bulber is the use of a biasing member for automatically returning the release mechanism to a first position after freeing the release mechanism with the discharge of a earth plug. The biasing member is preferably housed in the handle.

In another embodiment there is provided handheld gardening tool for creating holes in the earth comprising two side members meeting along side edges to form an inverted-conical frustum body having a first end and a second end, wherein the side members are pivotably connected to one another at two pivot points located at the side edges between the first and second ends, a handle attached to each side member at the first end of the conical body, and a movable release mechanism coupled to each side member between the handle and the pivot points within slotted openings located on each side and perpendicular to a longitudinal axis of the handle, wherein the second end is configured to facilitate digging and movement of the release mechanism toward the handle pivots the side members apart at the second end of the conical body from the pivot points.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring generally to FIGS. 1–12, there is illustrated a handheld bulber, designated consistently by the numeral 10. The bulber 10 preferably comprises a substantially inverted-conical frustum body 12 (i.e., a slightly tapering cylindrical body) having first and second sidewall members 13, 14, and a handle 15 attached to a first end 26 of each sidewall member 13, 14. A dirt release mechanism, generally designated by the number 16, is also attached to both sidewall members 13, 14, proximate the first end 26. Each of these specific components is discussed in greater detail below.

Referring specifically now to FIGS. 2–6, the sidewall members 13, 14 can be readily understood. The two substantially semi-conical members are preferably made from a rigid metal, such as stainless steel, and may be suitably coated to resist rust and other such degrading conditions. Each sidewall member 13, 14, comprises a first end 26 having a handle support 17, a serrated second end 27, and a middle section 28. The members 13, 14, are connected to one another at a pivot point 18 to form the tapering body 12. The pivot point 18, is provided by a rivet, pin or similar article loosely connecting the two members 13, 14 at two points on a common axis. To achieve the taper, the body 12 has a slightly larger measured diameter across the first end 26 than across the upper opening 25 of the second end 27.

Figure 3:
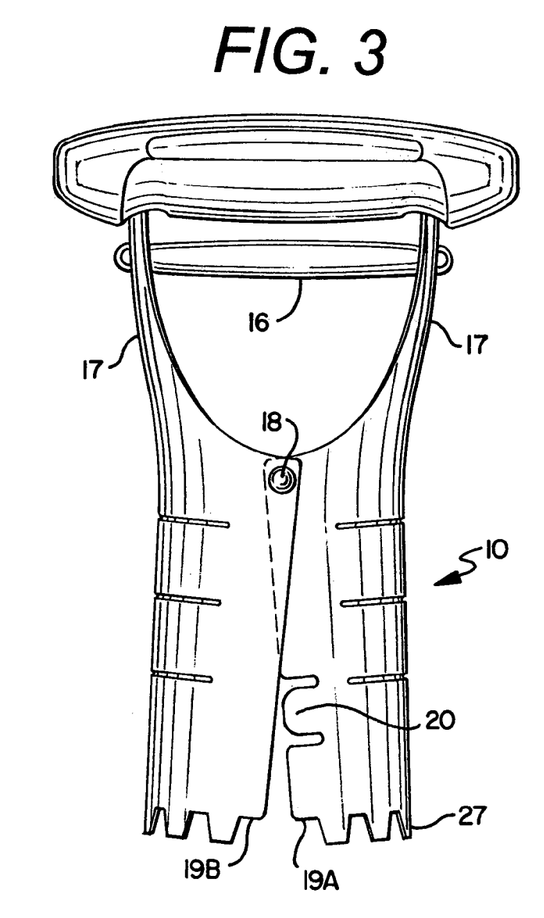
FIG. 3 is a front side view of the bulber of FIG. 2 with the dirt release mechanism in an open position.

As shown in FIG. 3, the two members 13, 14 meet and overlap along each of two vertical edges 19A, 19B, with an interlocking tab 20 on one edge to maintain the inverted-conical frustum shape of the body 12. Numerous configurations are possible to achieve the function of the interlocking tab 20, and would be well-understood to be included within this description by those skilled in the art.

As shown in the referenced figures, the second end 27 of each member 13, 14 is preferably comprised of a serrated or toothed edge to improve digging. Such toothed edge can be of any suitable shape, including crenellated, pointed, scalloped, or the like. Further, at least one of the members includes graduated markings, e.g., (in inches) 2, 3, 4, etc., on an outer surface of the middle section 28 to indicate to the user the approximate hole depth.

Figure 4:
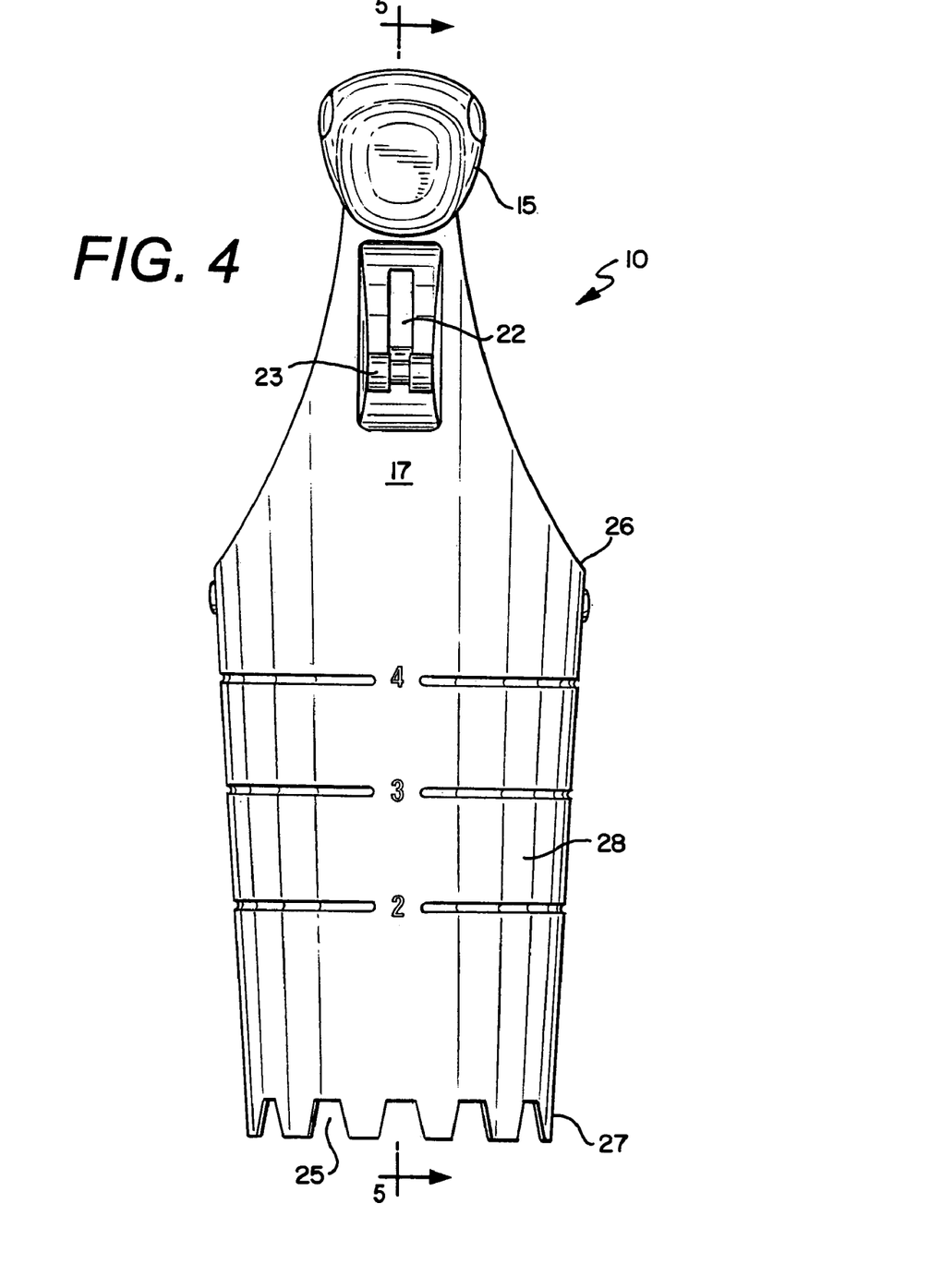
FIG. 4 is a side view of the bulber illustrated in FIG. 2.

Referring to FIG. 4, at the first end 26 of each sidewall member 13, 14, is located a handle support 17. The handle supports 17 are preferably integral to the sidewall members 13, 14. As further shown in FIG. 4, the handle supports 17 extend in a taper which is reverse to the body taper, and connect to the handle 15.

Figure 5:
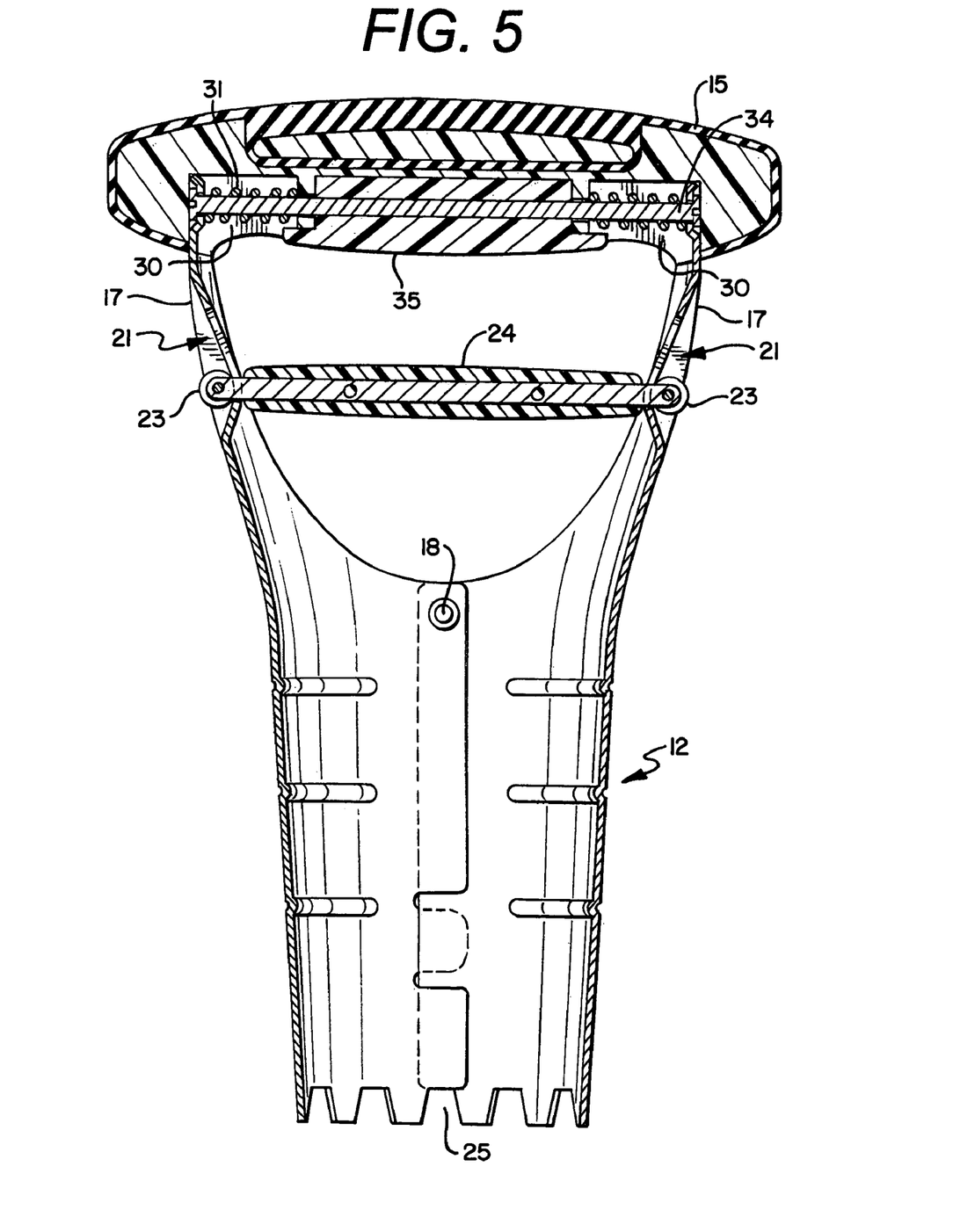
FIG. 5 is a cross-section of the bulber illustrated in FIG. 4 taken through line 5—5.
Figure 6:
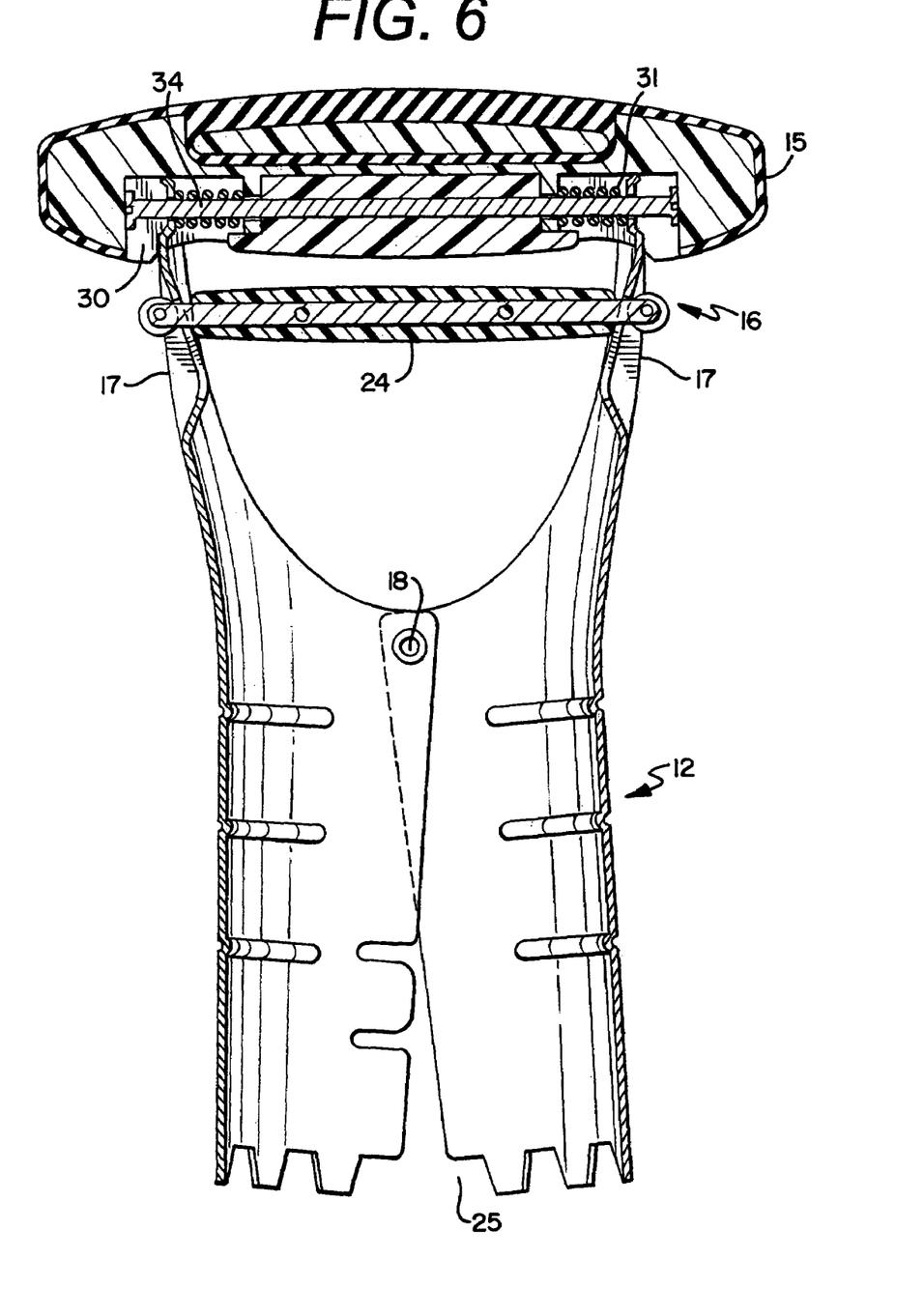
FIG. 6 is the same cross-section illustrated in FIG. 5 showing the dirt release mechanism in an open position.
Figure 7:
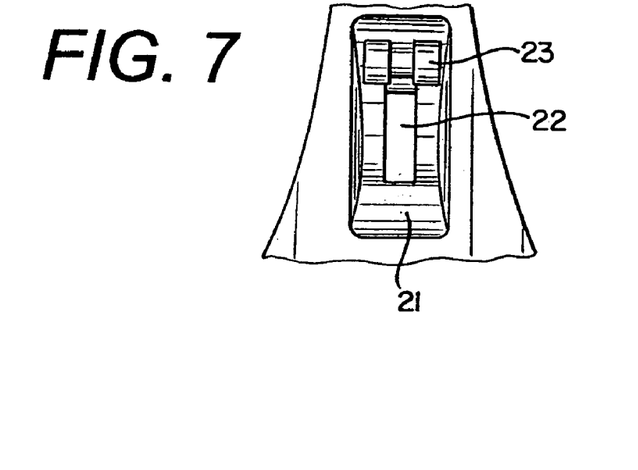
FIG. 7 is a partial side view of one embodiment of the release handle slide for the dirt release mechanism of the present bulber.

The connection of the handle supports 17 to the handle 15 is shown more clearly in FIGS. 5 and 6 and is discussed in further detail below. Beneath the handle connection on each handle support 17 is a recess 21. The recess 21 includes a vertical slot 22 within a base surface to allow travel of a slide member 23 upward, as shown in FIG. 7. FIG. 5 shows the slide member 23 in each recess 21 of the two handle supports 17 connected by a release handle 24 which spans an upper opening 25 of the bulber 10.

The two handle supports 17 are slidably connected together within the handle 15, as shown in FIG. 5. A pin 34 attaches preferably through a hole (not shown) in the end of each support 17 to allow each end to slide along the pin 34. A central core 35 of the handle 15 spans a fixed distance along the pin 34 between the two support ends. A void 30 is provided within the handle 15 on either side of the core 35 to allow each of the extended ends of the handle supports 17 to move horizontally within the handle 15, as illustrated by FIGS. 5 and 6. A biasing member 31 is employed in each void 30 to maintain the handle supports 17 biased outward from the core 35. The outward bias at the handle supports is transferred across the pivot point 18 to bias the second ends 27 inward. The biasing member 31, while illustrated as a spring pushing outward, could also include separate biasing members pulling outward on the handle supports as well.

Figure 8:
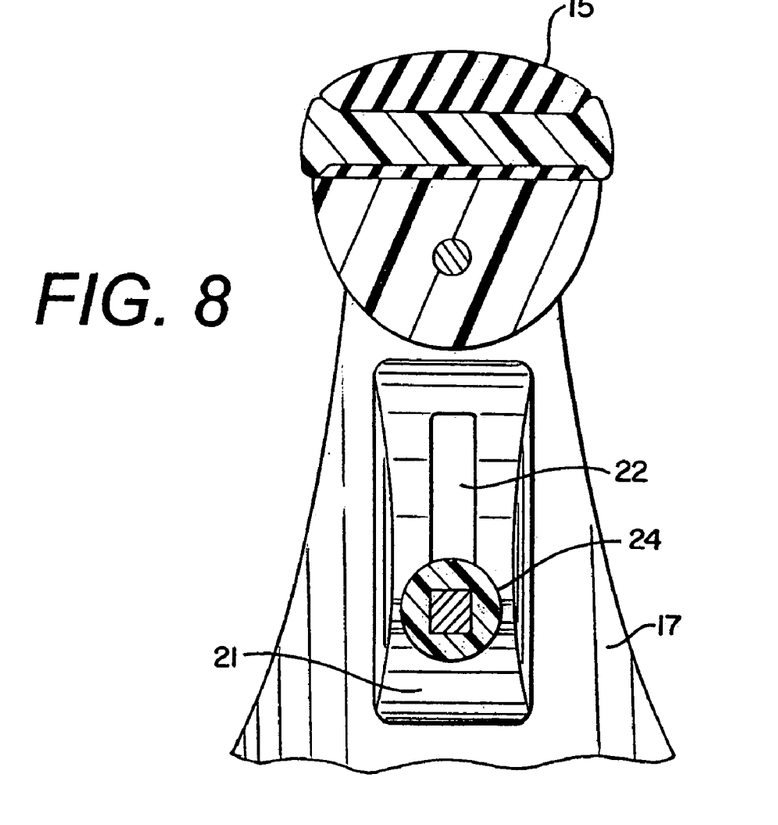
FIG. 8 is an enlarged cross-section taken through line 8—8 of FIG. 2.

In a preferred embodiment, the handle 15, and particularly the core 35, is comprised of a relatively hard material, such as a rigid polymer, wood, or metal, with at least a portion of the outer surface of the handle over-molded with a soft material, such as SANTOPRENE™ or similar material. Similarly, as illustrated in FIG. 8, the release handle 24 may also be comprised of a relatively hard core material over-molded with SANTOPRENE™.

Figure 9:
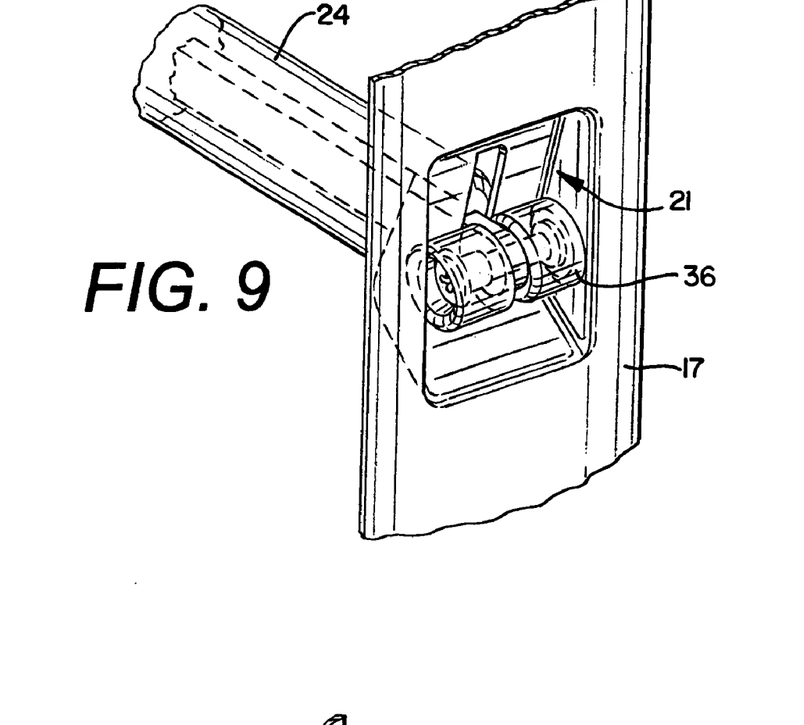
FIG. 9 is a perspective view of one embodiment of the release handle slide for the dirt release mechanism of the present bulber.
Figure 11:
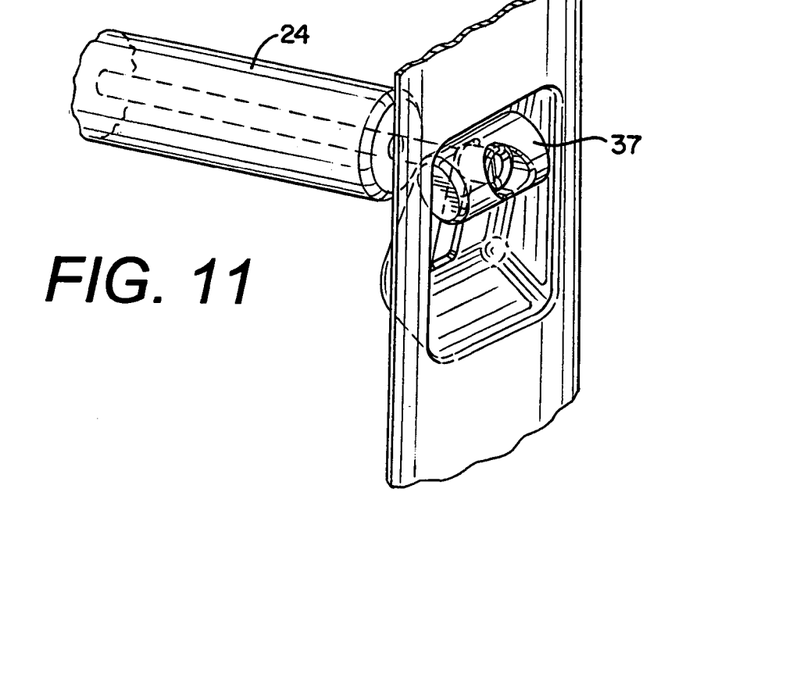
FIG. 11 is a perspective view of another embodiment of the release handle slide for the dirt release mechanism of the present bulber.

Referring to FIGS. 9 and 11, several embodiments of the slide member 23 of the dirt release mechanism 16 can be more readily understood. FIG. 9 illustrates a pair of rollers 36 bolted to an end of the release handle 24. The rollers 36 facilitate up and down movement of the release handle 24 within the slot 22. Alternatively, FIG. 11 illustrates a cap 37 likewise bolted to the end of the release handle 24. To facilitate movement, the cap 37 should be made from a material having a low coefficient of friction, as known to those in the art.

Figure 10:
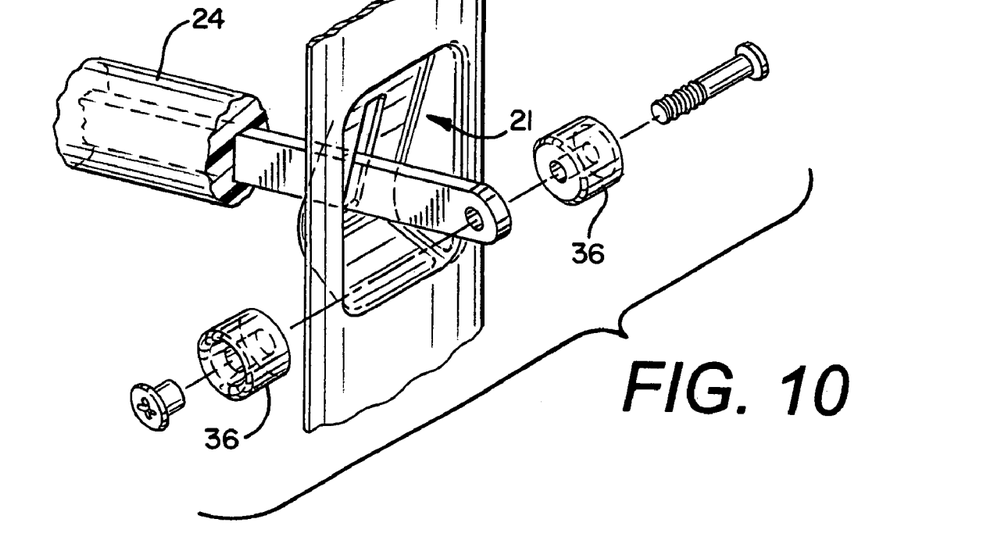
FIG. 10 is an exploded view of the handle slide of the dirt release mechanism shown in FIG. 9.
Figure 12:
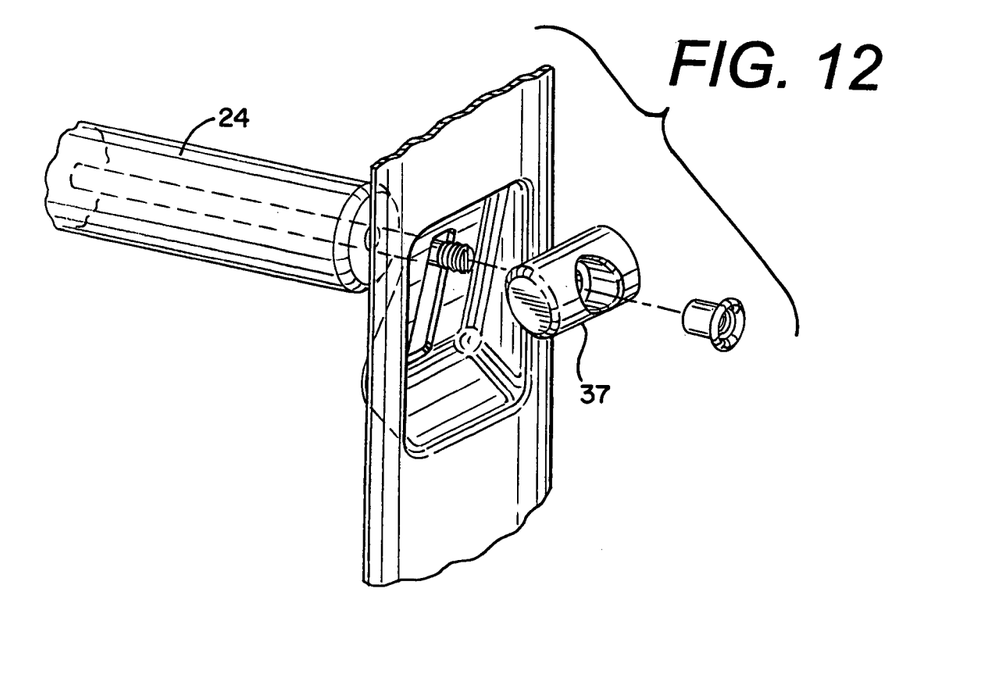
FIG. 12 is an exploded view of the handle slide of the dirt release mechanism shown in FIG. 11.

The dirt release mechanism 16 of the present bulber 10 is a collection of components, including the release handle 24, the handle biasing member 31, the body pivot point 18, the recesses 21 of the handle supports 17, and slide members 23, as shown in the many drawing figures. Operation of the mechanism 16 is uncomplicated. For example, the slide members 23, located within each recess 21, secure the release handle 24 to the sidewall members 13, 14, as illustrated in FIGS. 10 and 12. Due to the pitch of the base surface within the recess 21 and the fixed length of the release handle 24, upward vertical movement of the release handle 24 (i.e., toward the handle 15) draws in the ends of the handle supports, thereby opening the second end of the bulber 10, as shown in FIG. 6. Subsequent release of the release handle 24, allows the biasing member 31 in the handle 15 to return the second end 27 to a closed position by pushing outward on the ends of the handle supports.

With reference to FIGS. 1A–1D, the present bulber is illustrated in use. The user grasps the bulber 10 handle 15 and directs the serrated edge of the second end 27 of the bulber 10 into the ground to a desired depth using the graduated markings of the sidewall members 13, 14, as a guide. Back and forth rotation of the handle 15 to use the full effect of the serrated edge may be necessary, as known by those familiar to gardening, and particularly bulb planting.

Figure 1A:
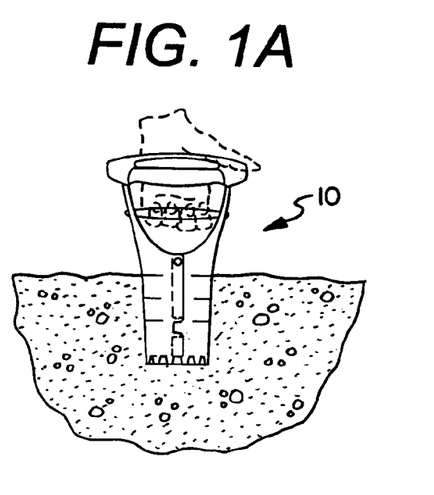
FIGS. 1A through 1D illustrate one embodiment of the present bulber in common use.
Figure 1B:
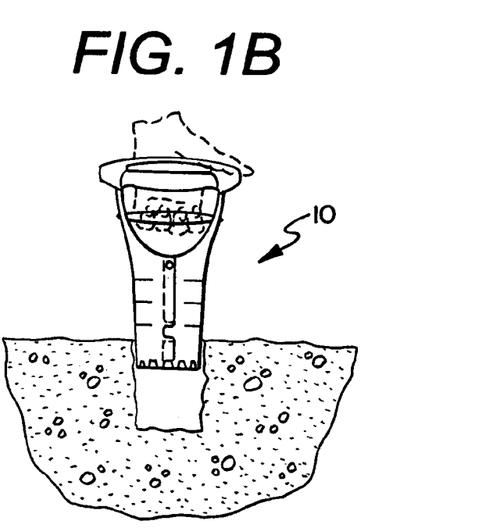
Figure 1C:
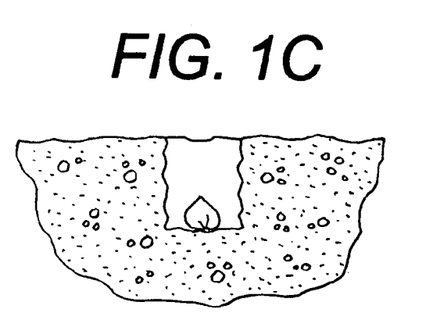
Figure 1D:
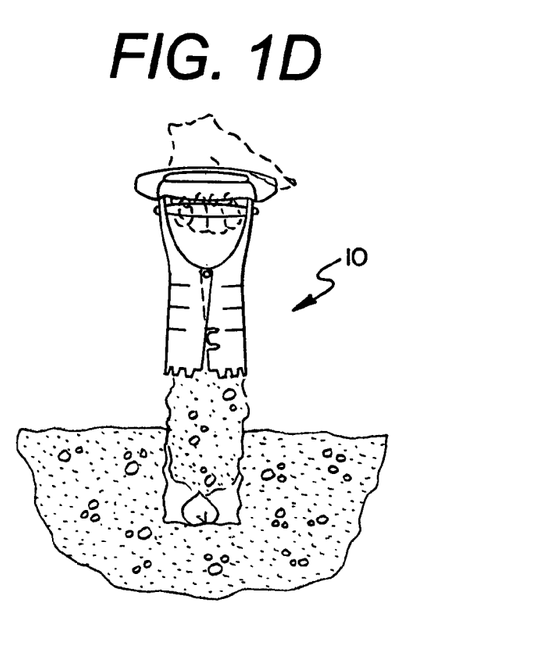
Figure 2:
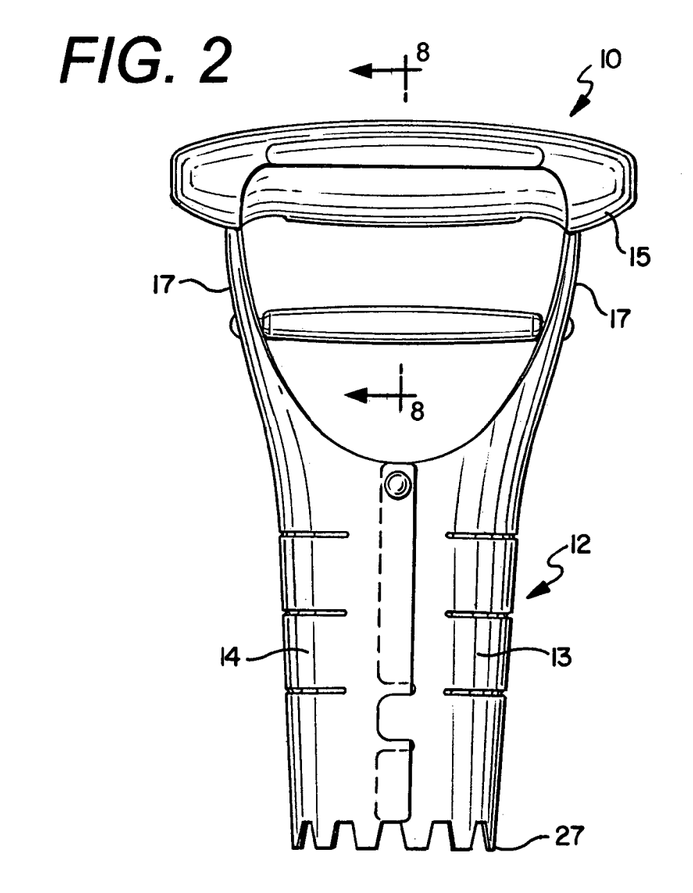
FIG. 2 is a front side view of an embodiment of the present bulber with the dirt release mechanism in a closed position.

Upon reaching the desired depth, the user retracts the bulber 10 from the ground, removing the dirt now entrapped in the bulber body 12 from the resulting hole. Once a plant bulb is placed into the hole, as shown in FIG. 1C, the entrapped dirt is returned to fill the hole by the user pulling upward on the release handle 24. This action pivots the second ends 27 of the sidewall members 13, 14, to the open position and releases the dirt.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A handheld gardening tool for creating holes in the earth comprising:

two sidewall members meeting along side edges to form a cylindrical body having a first end and a second end, wherein the sidewall members are pivotably connected to one another at two pivot points located at the side edges;

two extended supports, each integral to one of the sidewall members;

a handle attached directly to each extended support;

a movable release mechanism having two opposing ends, wherein each end is directly coupled to one of the extended supports between the handle attachment and the pivot points within slotted openings located on the extended supports; and wherein movement of the release mechanism within the slotted openings pivots the sidewall members apart at the second end of the body.

2. The handheld gardening tool of claim 1, further comprising a self-positioning tab located along a side edge of at least one of the sidewall members, wherein the tab overlaps an edge of the opposing sidewall member.

3. The handheld gardening tool of claim 1, wherein the slotted openings are positioned on a surface within a recess on each of the extended supports.

4. The handheld gardening tool of claim 3, wherein the surface within the recess on each of the extended supports is sloped outward from the release mechanism in a direction toward the handle.

5. The handheld gardening tool of claim 4, wherein the release mechanism slides within the slotted openings as it is moved toward the handle.

6. The handheld gardening tool of claim 4, wherein the release mechanism rolls within the slotted openings as it is moved toward the handle.

7. The handheld gardening tool of claim 1, wherein the release mechanism slides within the slotted openings as it is moved toward the handle.

8. The handheld gardening tool of claim 1, wherein the release mechanism rolls within the slotted openings as it is moved toward the handle.

9. The handheld gardening tool of claim 1, further comprising a biasing member attached to each extended support wherein the biasing member urges the sidewall members apart at the first end.

10. The handheld gardening tool of claim 9, wherein the biasing member is positioned within the handle.

11. The handheld gardening tool of claim 9, wherein the biasing member comprises a first spring biasing a first rod or pin against an interior surface of one extended support and a second spring biasing a second rod or pin against an interior surface of the other extended support.

12. The handheld gardening tool of claim 1, wherein an exterior surface of at least one sidewall member is graduated.

13. A bulber comprising:

a substantially rigid, cylindrical body having opposing sidewall members;

two extended supports, each integral to one of the sidewall members;

a handle attached directly at one end to each of the extended supports; and a release mechanism movably attached to a recessed surface on each of the extended supports;

wherein moving the release mechanism from a first position to a second position thereby pivots the sidewall members outward at an opposite end.

14. The bulber of claim 13, wherein the sidewall members are attached together at pivot points.

15. The bulber of claim 14, wherein the release mechanism is attached by each of two opposing ends directly to the extended supports between the handle and the pivot points.

16. The bulber of claim 13, further comprising a biasing member for automatically returning the release mechanism to the first position.

17. The bulber of claim 16, wherein the biasing member is housed in the handle.

18. The bulber of claim 13, wherein the recessed surfaces are sloped outward in a direction toward the handle.

19. A bulber comprising:

a substantially rigid, cylindrical body having opposing sidewall members;

two extended supports, each integral to one of the sidewall members;

a handle attached directly at one end to each of the extended supports; and a release mechanism movably attached within slotted openings in each of the extended supports;

wherein moving the release mechanism from a first position to a second position thereby pivots the sidewall members outward at an opposite end.

20. The bulber of claim 19, wherein an area of the extended supports proximate each slotted opening is sloped outward in a direction toward the handle.

21. The bulber of claim 19, wherein the release mechanism comprises a slider movably attached within the slotted openings.

22. The bulber of claim 19, wherein the release mechanism comprises rollers movably attached within the slotted openings.

* * * * *